Nov. 24, 1964     H. K. CYMARA     3,158,407
SILAGE DISTRIBUTOR
Filed Oct. 2, 1962
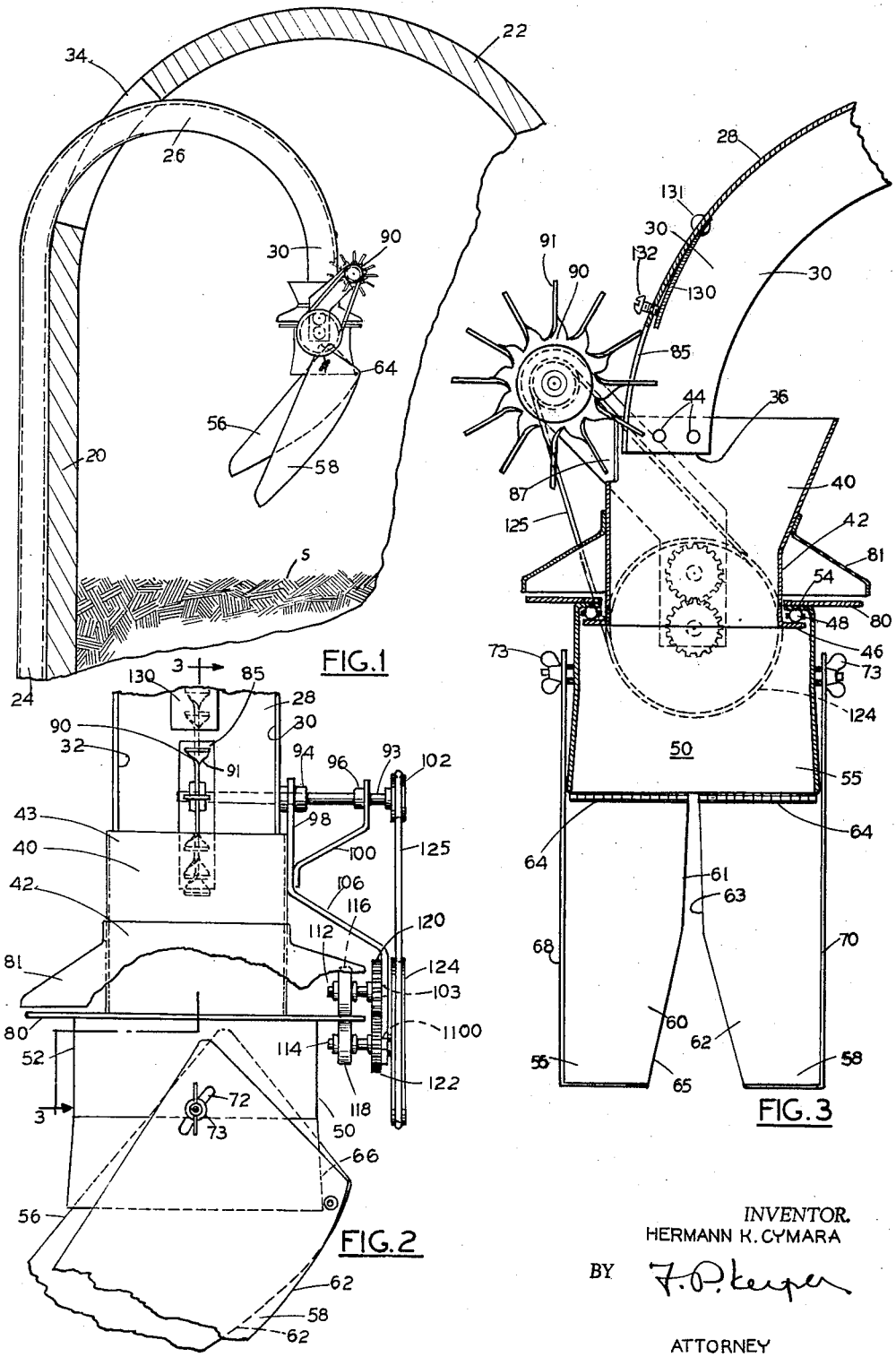
INVENTOR.
HERMANN K. CYMARA
BY ⁂
ATTORNEY

United States Patent Office 3,158,407
Patented Nov. 24, 1964

3,158,407
SILAGE DISTRIBUTOR
Hermann K. Cymara, R.D. 2, Newfield, N.Y.
Filed Oct. 2, 1962, Ser. No. 227,858
3 Claims. (Cl. 302—60)

This invention relates to a silage distributor for use in filling silos, and more particularly to a distributor that is fully adjustable, and actuated by the flow of silage delivered to the silo by the silage air stream.

In filling silos, it is the usual practice to deliver the silage through a duct, having a curved spout discharging downwardly into the silo, from beneath the roof thereof. While the discharge is usually directed downwardly in the center of the silo, to secure even fill, such discharge results in uneven filling of the silo. There is a tendency for the material to build up in a cone like pile which tends to deflect the heavier granular portions of the silage to roll toward the periphery. While directive chutes have been used to avoid such a build up, such chutes require constant attention, as the silo is being filled.

The present invention is directed toward a distributor which is adapted to evenly lay the silage over the entire cross sectional circular area of the silo, with a minimum of attention. The invention is further directed to a distributor which is rotary in character, and which derives its power from the silage flow. Furthermore the distributor is provided with a plurality of discharge chutes that may be independently set so that the silage discharge therefrom will be built up evenly, and the silage ingredients will be uniformly distributed throughout the entire process of filling the silo.

The other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 1 is a vertical fragmentary sectional view through the upper end of a silo showing the fill spout and distributor;

FIGURE 2 is a fragmentary view in side elevation of the distributor; with the chute rotated 90 degrees from the position shown in FIGURE 1;

FIGURE 3 is a sectional view taken substantially on the broken line 3—3 of FIGURE 2, with the chutes shown in elevation.

Referring to the drawings there will be seen the upper end of a circular silo 20, with its dome roof 22, and a closed fill conduit 24, with its somewhat semi-circular spout 26. The spout is usually open on the underside, and is of channel shape configuration, having a curved wall 28, and side flanges 30 and 32, and enters the silo through a window 34. The fill spout terminates with a downwardly extending discharge end 36, which is located centrally within the silo.

In order to provide for uniform distribution of the silage over the entire circular area of the silo, there is shown a sleeve like hopper 40, having a cylindrical lower section 42 and a rectangular upper section 43, the latter embracing and being secured to the discharge end 36 of the fill spout as by bolts 44, the arcuate wall 28 and side walls 30 and 32 of the spout being telescoped within the rectangular sectional portion of the hopper in the approximate manner shown in FIGURE 3. The lower end of the cylindrical section 42 is provided with an annular flange 46 upon which is supported an annular anti-friction thrust bearing 48. Supported on the thrust bearing is a depending discharge duct 50 the upper end of which is cylindrical as at 52, and is provided with an inturned annular flange 54, supported on the bearing 48. The lower end of such duct is rectangular as at 55, or approximately square in section and provided with a divided chute having left and right elements 56 and 58. Each chute element is provided with a curved bottom portion, such as 60 and 62, the upper ends of which are hinged as at 64 to the lower edge of one of the sides 66 of the duct 55. Each chute has a side wall, 68 and 70, and the upper ends thereof overlap the duct 50, and each side wall is provided with an arcuate slot 72, concentric with the axis of the hinge 64, and a bolt 73 extending through an aperture in the duct in alignment with the slot is provided with a wing nut, so that the two sections of the discharge chute can be angularly set independently of one another to discharge in any direction desired.

The discharge duct, swivelly mounted on the bearing 48, is adapted to be rotated about a vertical axis gradually during filling of the silo. For this purpose an annular drive disk 80 is secured to the inbent flange 54. To derive power for gradual rotation of the duct 50, there is mounted, adjacent the fill spout and hopper, a rotary impeller 90 having a plurality of blades 91 adapted to project into the stream of silage blown up into and around within the spout 26. The spout and hopper are provided with aligned slots 85 and 87 through which the blade tips 91 of the impeller 90 project. The impeller shaft 93 is rotatably mounted in spaced bearings 94 and 96, disposed on bracket arms 98 and 100 extending angularly and upwardly from the hopper sleeve to which they are affixed. The end of the shaft is provided with a small pulley 102.

A support arm extends downwardly from the bracket arm 98, and is provided with an outward offset 106 in which are journalled as at 108 and 110 stub shafts 112 and 114, the inner ends of such shafts extending radially inward and above and below the drive disk 80, respectively. Each shaft is provided with a rubber, or the like, friction drive roll 116 and 118 engaging under slight pressure the upper and lower surfaces of the drive disk 80. The two shafts 112 and 114 are caused to rotate in reverse directions by like inter-meshing pinions 120 and 122, and one of the stub shafts, such as 114 is extended outwardly beyond the bracket and fitted with a large pulley 124, lying in the plane of the impeller shaft pulley 102, and a suitable belt 125 is provided to drive the pulley 124 from the pulley 102.

The impeller blades swing through an arc inside the spout and hopper, and power is derived from the impingement of silage upon such blades. In order to regulate the power and speed of the impeller, which may be derived from the impingement and flow of silage therepast, a deflector strip 130 may be provided, the same being secured at its upper end to the inside wall of the spout as at 131. The lower end may resiliently normally lie against the inside surface of the spout, or be adjusted inwardly by an adjustment screw 132, the effect of such inward adjustment being to deflect the ensilage stream from full impingement upon the impeller blades to partial impingement, as desired.

As a silo is gradually filled, various adjustments of the right and left hand chute sections may be made, as well as adjustment of the deflector 130, whereby silage will be evenly distributed both as to the heavy granular portions, and leafy or fibrous portions.

The individual chutes will be separate and spaced from each other so that either may be swung past the other. Since such chutes may be adjusted so that both are at the same angle, the spacing between the two elements are such as to avoid possible jamming from caught silage. For this purpose, the adjacent edges 61 and 63 diverge to produce a slot of increasing width in a direction away from the hinge 64, and the lower ends of the chute section may be further cutaway as at 65.

To protect the drive disk 80 from deposit an annular shroud 81, affixed to the hopper may be provided, the shroud being deformed slightly as at 83 to cover the friction drive wheels 116 and 118.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A silage distributor adapted to receive silage from a silo discharge spout, comprising a hopper sleeve adapted to be attached to a silo discharge spout, an annular outwardly disposed flange at the lower end of said hopper sleeve, a discharge duct extending downwardly from the sleeve having an inwardly extending annular flange overlying the sleeve flange, anti-friction bearing means disposed between the flanges, an annular drive plate secured to the duct flange, drive means mounted on the sleeve and drivably coacting with said drive plate for rotating said duct about a vertical axis, laterally spaced chutes pivoted to a lower side edge of the duct, each of said chutes having adjacent inner side edges spaced apart and diverging away from each other in the direction away from the lower side edge, and means coacting between said chutes and duct for securing each of said chutes independent of the other in a desired angular relationship with respect to the duct.

2. A silage distributor according to claim 1, wherein each chute has an outer side wall, and said coacting means comprises a connection between the side wall of each chute and said duct.

3. A silage distributor adapted to receive silage from a silo discharge spout, comprising a hopper sleeve adapted to be attached to a silo discharge spout, an annular outwardly disposed flange at the lower end of said hopper sleeve, a discharge duct extending downwardly from the sleeve and having an inwardly extending annular flange disposed above the sleeve flange, anti-friction bearing means disposed between the flanges, an annular drive plate secured to the duct flange, drive means mounted on the sleeve and drivably coacting with said drive plate for rotating said duct about a vertical axis, a chute pivoted to a lower side edge of said duct on a transverse axis, said chute having a side wall along one side thereof, and open along the other side with its side edge converging toward the side wall in a direction away from the pivot, and means for securing the side wall to the duct to hold the chute in a desired angular relation with respect to the duct.

References Cited in the file of this patent

UNITED STATES PATENTS

| | | |
|---|---|---|
| 1,765,115 | Welles | June 17, 1930 |
| 1,786,677 | Sievert | Dec. 30, 1930 |

FOREIGN PATENTS

| | | |
|---|---|---|
| 862,142 | Great Britain | Mar. 1, 1961 |